United States Patent

Hartson et al.

[11] Patent Number: 5,286,505
[45] Date of Patent: Feb. 15, 1994

[54] METHOD FOR INFUSING RAISINS WITH HIGH LEVELS OF HUMECTANT

[75] Inventors: Barton L. Hartson, Battle Creek, Mich.; Miguel Guzman, Santa Clara; Steven Cauchi, Campbell, both of Calif.

[73] Assignee: Kellogg Company, Battle Creek, Mich.

[21] Appl. No.: 917,834

[22] Filed: Jul. 21, 1992

[51] Int. Cl.⁵ .............................................. A23L 1/212
[52] U.S. Cl. .................................... 426/321; 426/102; 426/640
[58] Field of Search .................... 426/321, 102, 640

[56] References Cited

U.S. PATENT DOCUMENTS

| | | | |
|---|---|---|---|
| 3,952,112 | 4/1976 | Fulger et al. | 426/321 |
| 4,103,035 | 7/1978 | Fulger et al. | 426/321 |
| 4,364,968 | 12/1982 | Waitman et al. | 426/639 |
| 4,433,002 | 2/1984 | Zilch | 426/640 |
| 4,696,824 | 9/1987 | Meczkowski et al. | 426/102 |
| 4,775,545 | 10/1988 | Augustine et al. | 426/639 |
| 4,917,910 | 4/1990 | Hsieh et al. | 426/102 |
| 4,961,943 | 10/1990 | Blanthorn | 426/102 |
| 5,000,971 | 3/1991 | Hsieh et al. | 426/302 |
| 5,073,400 | 12/1991 | Bruno et al. | 426/639 |

FOREIGN PATENT DOCUMENTS 1483805  8/1977  United Kingdom .

*Primary Examiner*—Joseph Golian
*Attorney, Agent, or Firm*—Felfe & Lynch

[57] ABSTRACT

Softness retention characteristics of raisins are improved by applying to the surface of the raisins a pure edible polyalcohol humectant, preferably glycerol, at a rate of 20-28% based on the weight of the raisins. The raisins and humectant are then tempered by immersing the raisins and humectant in additional humectant solution at a temperature of 90°-100° F. (32°-44° C.) for a times efficient to enable the raisins to absorb the humectant to an amount of about 10-19% by weight. The raisins are then removed from the humectant solution and thereafter dried to a moisture content of 7-20%.

18 Claims, No Drawings

100 # METHOD FOR INFUSING RAISINS WITH HIGH LEVELS OF HUMECTANT

FIELD OF THE INVENTION

This invention relates to methods for attaining and preserving the softness of dried fruits to be stored in isolation or in combination with other food products such as cake mixes and similar flour-based products and, in particular, dry ready-to-eat cereal breakfast foods. More particularly, this invention relates to methods for infusing relatively large amounts of humectants, particularly glycerol, into raisins intended to be formulated in combination with dry ready to eat breakfast foods.

BACKGROUND OF THE INVENTION

Fresh raisins and other dried fruits, even when sealed in waxed paper and foil within paperboard containers, progressively lose their softness and become hard, presumably because of moisture losses and chemical changes. The loss of softness or tenderness becomes more pronounced when the raisins are packed with dry food products, such as toasted bran or corn flakes, which have a low moisture content relative to the raisins. In order to prevent rapid loss of moisture from the raisins to the cereal, it previously has been necessary to increase the moisture content of the cereal prior to packaging with raisins. The addition of moisture to the cereal, however, causes a substantial loss of crispness, which is undesirable in many such products.

An alternative method of keeping raisins soft is to employ an edible humectant, such as glycerol. However, the simple topical application of a humectant to a dried fruit, such as raisins, having a relatively tough outer skin does not reliably increase the softness retention characteristics of the fruit under storage conditions, and the fruit will absorb only small amounts of the humectant through the skin. Moreover, any improvement in softness retention resulting from the initial incorporation of a high level of moisture into the fruit is quickly lost during conventional storage.

There are various known methods which involved the treatment of raisins and other dried fruits which involve infusion of edible humectants into said fruits. These methods suffer from one or more disadvantages, including the necessity of a pretreatment step using acids, alkalis, surfactants, and similar additives which necessitate one or more specific removal steps. In other methods of infusion, the total amount of humectant which can possibly be added to raisins is generally below 10% by weight. Still other methods permit the infusion of higher levels of humectant but these methods generally suffer lack of uniformity—i.e. humectant levels vary in an unsatisfactorily broad degree—or the methods call for a process which requires two or three days, or more, for completion.

U.S. Pat. No. 4,696,824 discloses a process of coating a surface of raisins with glycerol and oil in order to improve their bulk handling and bulk transportation characteristics. The surface treatment of raisins which humectant, such as glycerol, has long been known but, as noted above, surface treatment alone does not prevent the undesirable drying out of raisins when packaged with dry products such as ready-to-eat cereals.

U.S. Pat. Nos. 3,952,112 and 4,103,035 teach methods of treating raisins with glycerol (and other polyalcohol humectants) by a process involving immersion and soaking of the raisins in glycerol or a glycerol-containing solution for a period of about 24 hours. Pretreatment of the raisins is ordinarily required. U.S. Pat. No. 3,952,112 teaches various pretreatment steps which enhance the ability of the raisins to absorb the glycerol during the soaking process. Such pretreatment steps include soaking the raisins in water, application of a vacuum, treating with small amounts of a surface active agent or a weak alkali, etc. In U.S. Pat. No. 4,103,035 the suggested pretreatment steps include soaking in water and treatment with an acidulating agent. By means of the processes taught in these patents, and with proper choice of reaction times and conditions, it has been possible to attain high levels of glycerol in raisins. However, under industrial conditions, the glycerol content of the raisins has varied considerably. The result is that not all of the raisins attained the desired high levels of glycerol infusion and therefore, when packaged with dry cereals, some of these dried out to an unsatisfactory degree.

More recently, U.S. Pat. Nos. 4,917,910 and 5,000,971 disclosed a method of infusing high levels of glycerol into raisins by means of an initial step involving the spraying of glycerol onto a tumbling bed of raisins. It appears, however, that in order to attain a high level of glycerol infusion the raisins have to then be maintained in a static condition for a period of time of about four weeks.

It is the principal object of this invention to provide an improved process for infusing high levels of glycerol into raisins by a method which does not require substantially more than 24 hours of processing time and results in a product having a substantially uniform level of glycerol infusion.

SUMMARY OF THE INVENTION

Raisins having a moisture content of about 18% to about 26%, or preferably about 20 to 24% are sprayed with pure glycerol at a temperature of from about 150° F. (65° C.) to 190° F. (88° C.) in sufficient amount to provide a glycerol content from about 20 to about 28 percent based on the weight of the raisins. The glycerol-treated raisins are then placed in a tempering bin with sufficient glycerol solution added to ensure that the raisins are completely immersed, and maintained at a temperature are from about 95° F. (35° C.) to 105° F. (41° C.) for sufficient time (usually 24 hours) to permit the absorption of about 10 to 19% by weight glycerol into the raisins. The raisins are then separated from the used glycerol solution and the used glycerol solution is employed as the glycerol solution added in the tempering bin. The glycerol-infused raisins are thereafter dried to a moisture content of from about 11 to about 15%.

DETAILED DISCLOSURE

The process of this invention represents an improvement from processes disclosed in U.S. Pat. Nos. 3,952,112 and 4,103,035. Our improved process does not involve the use of the acids, alkalis or surfactants all of which would have to be carefully washed away. It does not require the use of a vacuum pretreatment, which would require costly equipment. Furthermore, this process provides a method for attaining raisins with a uniformly high level of humectant in the process requiring no more than about 24 hours.

The raisins usable in this process should have a moisture content of from about 18% to about 26%, or preferably about 20 to about 24%. Typically, commercially available untreated raisins will have a moisture content of from about 11 to 14% and it will therefore be necessary in most cases to rehydrate the raisins to the desired moisture content level. The rehydration step consists essentially of immersing the raisins in a hot water bath at a temperature of from about 170° F. (76° C.) to about 180° F. (83° C.) for a period of 60 to 90 seconds. In addition to increasing the moisture content to the desired level, this rehydration step also acts to remove natural waxes from the surface of the raisins and to open pores.

The humectants usable in the process of this invention are the usual humectants used in the processing of dried fruits. They include the edible polyalcohols such as glycerol, sorbitol, mannitol and others, as well as mixtures thereof. The most generally used humectants are glycerol alone or glycerol admixed with sorbitol. The details of this invention will generally be discussed in terms of glycerol as the humectant, but it should be understood that the invention is equally applicable to other known polyalcohol humectants and to mixtures thereof with glycerol, such as, for example glycerol and sorbitol.

Raisins having the desired moisture content of 20 to 24% are sprayed with pure glycerol at a temperature of from about 150° F. (65° C.) to 190° F. (88° C.), preferably low 160° F. (71° C.) to 180° F. (83° C.), the amount of glycerol ranging from about 20 to about 28% by weight of the raisins. Preferably, the glycerol content should be between 22 and 26 weight percent. This spraying step should be done in such a way as to ensure that the glycerol is sprayed on the entire surface of the raisins and, for this purpose, a multi-jet spray mechanism is normally employed. Only a portion of the sprayed glycerol is absorbed into the raisins and therefore the result of the spraying process will be mostly a mixture of glycerol and raisins coated with glycerol. This mixture is then transferred to a tempering vessel maintained at a temperature of from about 90° F. (32° C.) to about 110° F. (44° C.), preferably at about 100° F. (38° C.). Sufficient additional glycerol solution is added to ensure that the raisins are completely immersed in a glycerol solution. The added glycerol solution should contain, at minimum, 40% of glycerol, preferably 45% glycerol, the remainder consisting essentially of water and sugar.

After a period of from about 20 to 24 hours in the tempering bin, maintained at the above indicated temperature, the raisins and the glycerol solution are separated. The raisins are rinsed with water and then passed to a drying stage. The glycerol solution is recycled to a tempering bin and used as the additional glycol solution required to keep the raisins completely immersed. In order to ensure that the glycerol solution in the tempering bins has a sufficiently high glycerol content, periodic samples of the solution are taken and glycerol content measured. If the glycerol content goes below about 40% (more preferably, 45%), sufficient additional pure glycerol is added to the tempering bin to provide the required glycerol content both in the bin and in the used glycerol solution destined for recycling.

The raisins removed from the tempering bin have a glycerol content of from about 10% to about 19%, more likely from 12 to 16.5%. After rinsing, the raisins have a moisture content of about 20 to 24%. The raisins are then subjected to a drying step in order to attain a final moisture content of from about 11 to about 15%. The drying step takes place at a temperature between about 130° F. (54° C.) and 180° F. (83° C.), typically at a temperature of about 140° F. (60° C.), and requires a period of about 60 to 90 minutes. Conveniently, the drying can be accomplished in three stages, the first stage having a temperature of about 170° F. (77° C.), the second stage a temperature of 140° F. (60° C.) and the third stage a temperature of about 70° F. (21° C.).

As further processing steps, the raisins can be sprayed with edible vegetable oil in an amount of from about 0.5 to about 1% and then, if desired, coated with sugar.

This invention will be better understood by reference to the following example, which is included here for illustrative purposes only and is not to be construed as a limitation.

EXAMPLE

Raw raisins with a moisture content of about 11 to 14% were dumped into a hopper containing a stirring/breaking mechanism which breaks up any agglomerated lumps. From the hopper, the raisins were then placed into a conveyor system which feeds the raisins into a rehydration tank containing water maintained at a temperature of about 175° F. (79° C.). The raisins stayed in this water bath for a period of about 1 to 2 minutes and emerged from said bath with a moisture content of about 20 to 24%. These rehydrated raisins then passed onto a tempering belt with which there is associated a paddling mechanism to ensure that the raisins have a uniform depth on the belt. From this tempering belt, the raisins passed through a dewatering shaker which shakes out excess moisture and the raisins were then passed to an inclined auger about 16 feet (5 m) long and 12 inches (30 cm) wide. Adjacent to the auger is a glycerol spraying mechanism comprising 10 jets from which glycerol was sprayed onto the surface of the raisins. The amount of glycerol sprayed was monitored so that from about 22 to about 26 pounds of glycerol Were sprayed per 100 pounds (11 to 13 kg per 50 kg) of raisins. The temperature of the sprayed glycerol is maintained at from 170° F. (76° C.) to 180° F. (83° C.).

After passing through the auger, the raisins/glycerol mixture was discharged into tempering bins. There was a substantial amount of free glycerine which rose to a level approximately one half of the depth of the raisins in the bins. Used glycerol solution from other tempering bins, comprising about 50% glycerol, 25% sugar and 25% water was added to the tempering bins until all of the raisins are covered. The bins were then placed into a tempering room, covered, and maintained at a temperature of about 100° F. (38° C.). During the tempering process, the glycerol content of the solution was measured from time to time to ensure that the glycerol content did not fall below about 45%. If the glycerol content should fall below this limit, additional pure glycerol would be added.

After the tempering process is complete, the bins of raisins and used glycerol solution were dumped onto a shaker pan, with the raisins and the glycerol solution being separated. The glycerol solution is (after any necessary addition of pure glycerol) employed as additional glycerol solution in other tempering bins.

The raisins were rinsed with fresh water and oven dried in a three-stage dryer. The first stage had a temperature of 170° (77° C.); the second stage has a temperature of 140° F.; and the third stage had a temperature of 70° F. (21° C.). The entire drying process required about 90 minutes. The raisins emerging from the dryer have a glycerol content of from 12 to 16.5% and a moisture content of from 11 to 14%.

We claim:

1. A method of improving softness retention characteristics of raisins which comprises the steps of:
   (a) providing raisins with a moisture content of from about 18 to about 26%;
   (b) spraying the surface of said raisins pure 100% edible polyalcohol humectant at a temperature of from about 150° F. to about 190° F. in an amount of pure 100% edible polyalcohol humectant from about 20 to 28% based on the weight of the raisins;
   (c) immediately immersing said raisins from step (b) with a sufficient amount of humectant solution, to completely immerse said raisins, wherein said humectant solution is at least 40% of said humectant;
   (d) tempering said raisins from step (c) at a temperature of from about 90° F. to about 110° F. for sufficient time to enable the raisins to absorb said humectant to an amount of from about 10% to about 19% by weight;
   (e) separating the raisins from said humectant solution;
   (f) recycling said humectant solution resulting from step (e) to step (c) after adding additional humectant to maintain at least 40% humectant in said humectant solution; and
   (g) rinsing and drying the raisins from step (e) to a moisture content of from about 7% to about 20%.

2. A method according to claim 1 in which the edible polyalcohol humectant is selected from the group consisting of glycerol, sorbitol, propylene glycol, mannitol and mixtures thereof.

3. A method according to claim 2 in which the edible polyalcohol humectant is glycerol or a mixture of glycerol and sorbitol.

4. A method according to claim 3 in which the edible polyalcohol humectant is glycerol.

5. A method according to claim 3 in which the raisins are first hydrated with water at a temperature of from 160° to 190° for sufficient time to attain the moisture content of from about 18 to about 26%.

6. A method according to claim 5 in which the raisins are hydrated at a temperature of from 170° to 180° to attain a moisture content of from 20 to 24%.

7. A method according to claim 5 in which the hydration time is from about 60 seconds to about 90 seconds.

8. A method according to claim 3 in which the humectant is a temperature of 160° to 180° F.

9. A method according to claim 8 wherein the amount of humectant applied is from 20 to 24% based on the weight of the raisins.

10. A method according to claim 3 where the tempering step takes place at a temperature of about 100° F.

11. A method according to claim 3 in which the raisins are tempered for a period of from about 20 to about 26 hours.

12. A method according to claim 10 wherein the amount of humectant absorbed into the raisins is from about 12 to about 16.5 weight percent.

13. A method according to claim 3 wherein the raisins are dried to a moisture content of from about 11 to about 15 weight percent.

14. A method according to claim 1 where there is added to the tempering bin sufficient pure glycerol to maintain the glycerol content of the recycled glycerol solution at a minimum of 45%.

15. A method according to claim 1 wherein the drying step is performed at temperatures ranging from about 130° to 180° F. for a time period of about 60 to about 90 minutes.

16. A method according to claim 1 wherein the drying step is performed in a series of discrete successive drying stages of from about 165° to about 175° F., from about 135° to about 145° F., and from about 65° to about 75° F., for a total time period of about 60 to about 90 minutes.

17. A method according to claim 1 which comprises the additional step of coating the raisin product with a vegetable oil to provide a surface coating of from about 0.5 to about 1 weight percent.

18. Method of claim 1, wherein said additional humectant of step (f) is pure 100% glycerol.

* * * * *